(12) United States Patent
Fukasawa

(10) Patent No.: US 7,590,833 B2
(45) Date of Patent: Sep. 15, 2009

(54) PORTABLE ELECTRONIC APPARATUS, INFORMATION PROCESSING METHOD, AND PROGRAM

(75) Inventor: Hidefumi Fukasawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 510 days.

(21) Appl. No.: 11/294,393

(22) Filed: Dec. 6, 2005

(65) Prior Publication Data

US 2006/0136707 A1 Jun. 22, 2006

(30) Foreign Application Priority Data

Dec. 7, 2004 (JP) ............................. 2004-353583

(51) Int. Cl.
*G06F 9/24* (2006.01)
*G06F 9/00* (2006.01)
*G09G 5/00* (2006.01)

(52) U.S. Cl. ............................. 713/1; 713/2; 345/169

(58) Field of Classification Search ............... 713/1, 713/2

See application file for complete search history.

(56) References Cited

U.S. PATENT DOCUMENTS

| | | | |
|---|---|---|---|
| 5,475,441 A | | 12/1995 | Parulski et al. |
| 6,078,756 A | * | 6/2000 | Squilla et al. ............... 396/300 |
| 6,191,699 B1 | * | 2/2001 | Sawada ................. 340/815.45 |
| 6,202,061 B1 | | 3/2001 | Khosla et al. |
| 6,360,362 B1 | | 3/2002 | Fichtner et al. |
| 6,760,074 B1 | | 7/2004 | Maruyama et al. |
| 7,027,881 B2 | * | 4/2006 | Yumoto et al. ................. 700/65 |
| 7,095,402 B2 | * | 8/2006 | Kunii et al. .................. 345/169 |
| 7,331,051 B2 | * | 2/2008 | Wong et al. .................. 719/327 |
| 7,386,872 B2 | * | 6/2008 | Shimizu ...................... 725/105 |
| 2002/0123336 A1 | * | 9/2002 | Kamada ...................... 455/420 |
| 2002/0169950 A1 | | 11/2002 | Esfahani et al. |
| 2004/0109066 A1 | | 6/2004 | Inoue et al. |

FOREIGN PATENT DOCUMENTS

| | | |
|---|---|---|
| EP | 0 358 292 A2 | 3/1990 |
| JP | 1999-096097 | 4/1999 |
| JP | 2000-020434 | 1/2000 |
| JP | 2000-285050 | 10/2000 |
| JP | 2003-023556 | 1/2003 |
| JP | 2003-216433 | 7/2003 |
| JP | 2004-012695 | 1/2004 |
| JP | 2004-222329 | 8/2004 |
| JP | 2004-228793 | 8/2004 |

OTHER PUBLICATIONS

European Search Report re: European Application No. 05257368.0 dated Mar. 10, 2006.
Japanese Office Action mailed Dec. 25, 2008 in counterpart Japanese Application No. 2004-353583.
Japanese Office Action mailed Oct. 9, 2008 in counterpart Japanese Application No. 2004-353583.

* cited by examiner

*Primary Examiner*—Suresh K Suryawanshi
(74) *Attorney, Agent, or Firm*—Finnegan, Henderson, Farabow, Garrett & Dunner, L.L.P.

(57) ABSTRACT

Disclosed is a portable electronic apparatus that is connected to an information processing apparatus via a network. The portable electronic apparatus includes a storage section and an acquisition section. The storage section stores a communication program for communicating with the information processing apparatus. The acquisition section communicates with the information processing apparatus in accordance with the communication program when the power is turned on, and acquires a program other than the communication program from the information processing apparatus via the network.

12 Claims, 13 Drawing Sheets

PORTABLE ELECTRONIC APPARATUS, INFORMATION PROCESSING METHOD, AND PROGRAM

CROSS REFERENCES TO RELATED APPLICATIONS

The present invention contains subject matter related to Japanese Patent Applications 2004-353583 filed in the Japanese Patent Office on Dec. 7, 2004, the entire contents of which being incorporated herein by reference.

BACKGROUND OF THE INVENTION

The present invention relates to a portable electronic apparatus, information processing method, and program, and more particularly to a portable electronic apparatus, information processing method, and program for properly storing up-to-date programs on storage unit.

FIG. 1 shows typical programs that are stored in a nonvolatile memory of a conventional digital still camera.

The nonvolatile memory 1 shown in FIG. 1 is typically an EEPROM (Electronically Erasable and Programmable Read Only Memory) or FLASHROM (flash memory) The nonvolatile memory 1 stores a bootloader 11 having a size of approximately 64 kilobytes, an OS 12 having a size of approximately 32 kilobytes, firmware 13 having a size of approximately 2 megabytes, and an application 14 having a size of approximately 1 megabyte. The firmware 13 includes a device driver 21 and middleware 22.

The bootloader 11 is a program for starting the OS 12. The OS 12 is a program for enabling the digital still camera to exercise its basic functions. The device driver 21 is a program that the OS 12 uses, for instance, to drive a lens of the digital still camera. The middleware 22 is a program for supplying functions that are specialized for use by the application 14. The application 14 is a program for exercising specific functions.

FIG. 2 illustrates a process that is performed by the conventional digital still camera having the nonvolatile memory 1 shown in FIG. 1.

When the user issues a power-on instruction, a CPU (Central Processing Unit) 31 in the digital still camera 30 executes the bootloader 11 (FIG. 1) that is stored at a predetermined address within the nonvolatile memory 1 as indicated in FIG. 2. In accordance with the bootloader 11, the CPU 31 stores the OS 12, firmware 13, and application 14, which are stored in the nonvolatile memory 1, in a RAM (Random Access Memory) or other volatile memory 32. In this manner, a program rewrite or loading operation can be performed in relation to the volatile memory 32. As a result, the speed of a program rewrite/loading operation is faster than when the program rewrite/loading operation is performed in relation to the nonvolatile memory 1.

The CPU 31 starts and executes the OS 12. The CPU 31 initializes a device 33 in accordance with the OS 12. The digital still camera 30 is then ready for shooting.

Meanwhile, the program may be updated from time to time. When the conventional digital still camera 30 is used, the user judges as needed whether an update is created for the program stored in the nonvolatile memory 1 by a manufacturer or the like. If it is judged that such an update is created, the user instructs the digital still camera 30 to update the program stored in the nonvolatile memory 1. Consequently, the program stored in the nonvolatile memory 1 is updated.

There is an image printing system, which is disclosed, for instance, by Japanese Patent Laid-open No. 2004-222329. When a digital still camera is connected to a personal computer within this image printing system, the digital still camera downloads a file to the personal computer.

Further, there is a wireless terminal, which is disclosed, for instance, by Japanese Patent Laid-open No. 2004-228793. When this wireless terminal is turned on with its wireless function activated, it receives a network-specific ID from an access point.

SUMMARY OF THE INVENTION

When the digital still camera 30 shown in FIG. 2 is used, the user checks whether a program update is created. Therefore, if the user does not run such a check on a periodic basis, an updated program might be left stored in the nonvolatile memory 1. Therefore, when the digital still camera 30 shown in FIG. 2 is used, it is difficult to constantly store an up-to-date program in the nonvolatile memory 1.

Further, when the user of the digital still camera 30 shown in FIG. 2 judges that a program update is created, the user issues an instruction for rewriting the program stored in the nonvolatile memory 1. Therefore, if, for instance, an error occurs during a program rewrite, wrong data may overwrite the program stored in the nonvolatile memory 1, making the digital still camera 30 inoperative.

The present invention has been made in view of the above circumstances to ensure that an up-to-date program can be properly stored.

A portable electronic apparatus according to an embodiment of the present invention includes a storage section and an acquisition section. The storage section stores a communication program for communicating with an information processing apparatus. The acquisition section communicates with the information processing apparatus in accordance with the communication program when the power is turned on, and acquires a program other than the communication program from the information processing apparatus via a network.

The program other than the communication program may be an OS (Operating System), device driver, middleware, or application.

The portable electronic apparatus may further include a shooting section and a transmission section. The shooting section shoots a subject. The transmission section transmits image data, which is obtained when the shooting section shoots a subject, to the information processing apparatus via a network and stores the image data.

The portable electronic apparatus may further include a load judgment section for judging whether an image data recording medium is loaded. If the load judgment section judges that no recording medium is loaded, the transmission section can transmit image data.

The portable electronic apparatus may further include a capacity judgment section for judging whether the free space remaining on the recording medium is smaller than a predetermined value. Even when the load judgment section judges that a recording medium is loaded and the capacity judgment section judges that the free space remaining on the recording medium is smaller than the predetermined value, the transmission section transmits image data.

An information processing method according to an embodiment of the present invention includes an acquisition step for communicating with the information processing apparatus in accordance with the communication program when the portable electronic apparatus is turned on, and acquiring a program other than the communication program from the information processing apparatus via the network.

A program according to an embodiment of the present invention includes an acquisition step for acquiring another program from the information processing apparatus via the network when the portable electronic apparatus is turned on.

When the power is turned on, the communication program for communicating with the information processing apparatus communicates with the information processing apparatus to acquire a program other than the communication program from the information processing apparatus via the network.

The present invention makes it possible to properly store an up-to-date program.

DETAILED DESCRIPTION OF THE PREFERRED EMBODIMENTS

Figure 1:
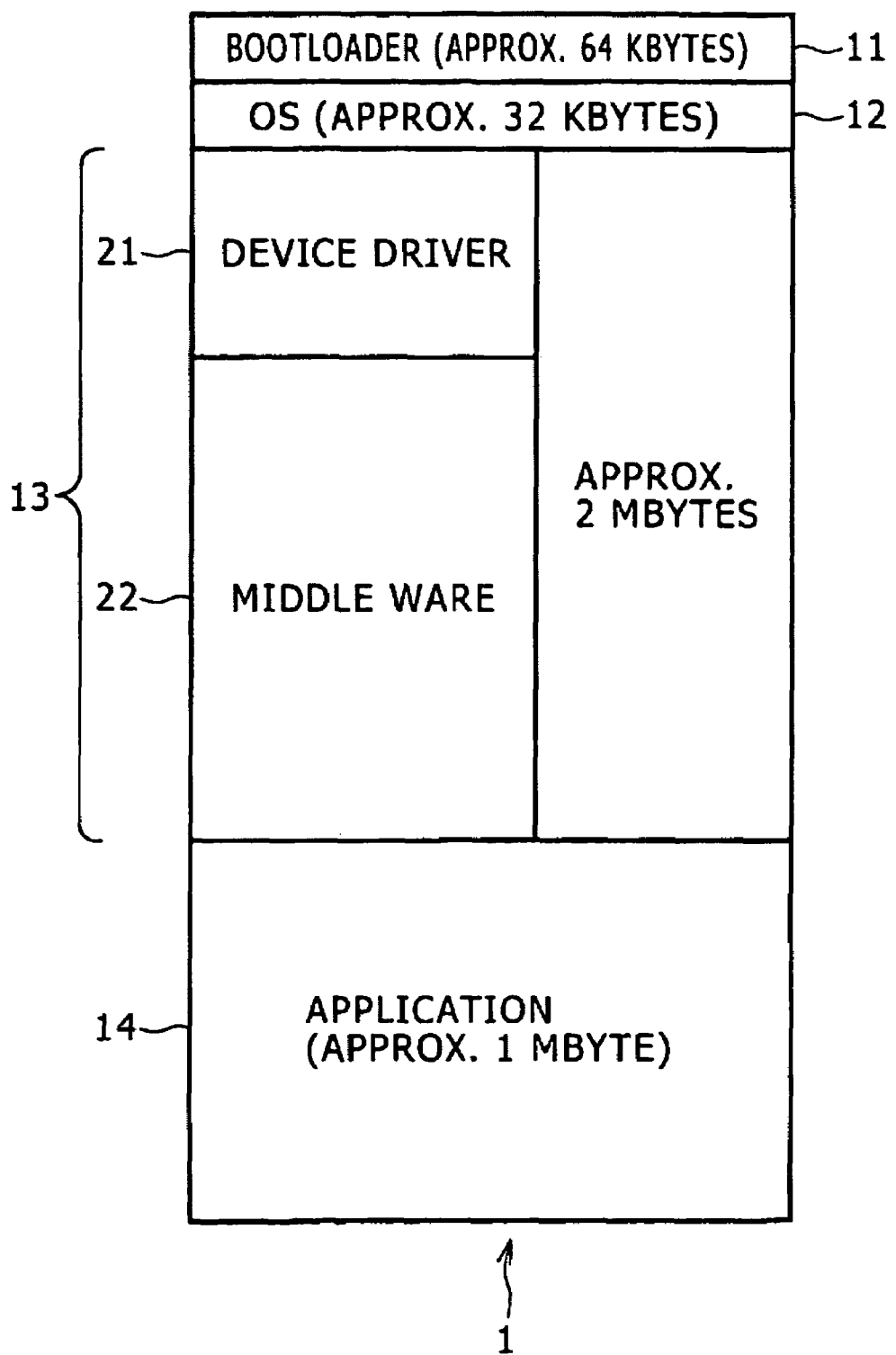
FIG. 1 shows typical programs that are stored in a nonvolatile memory of a conventional digital still camera.
Figure 2:
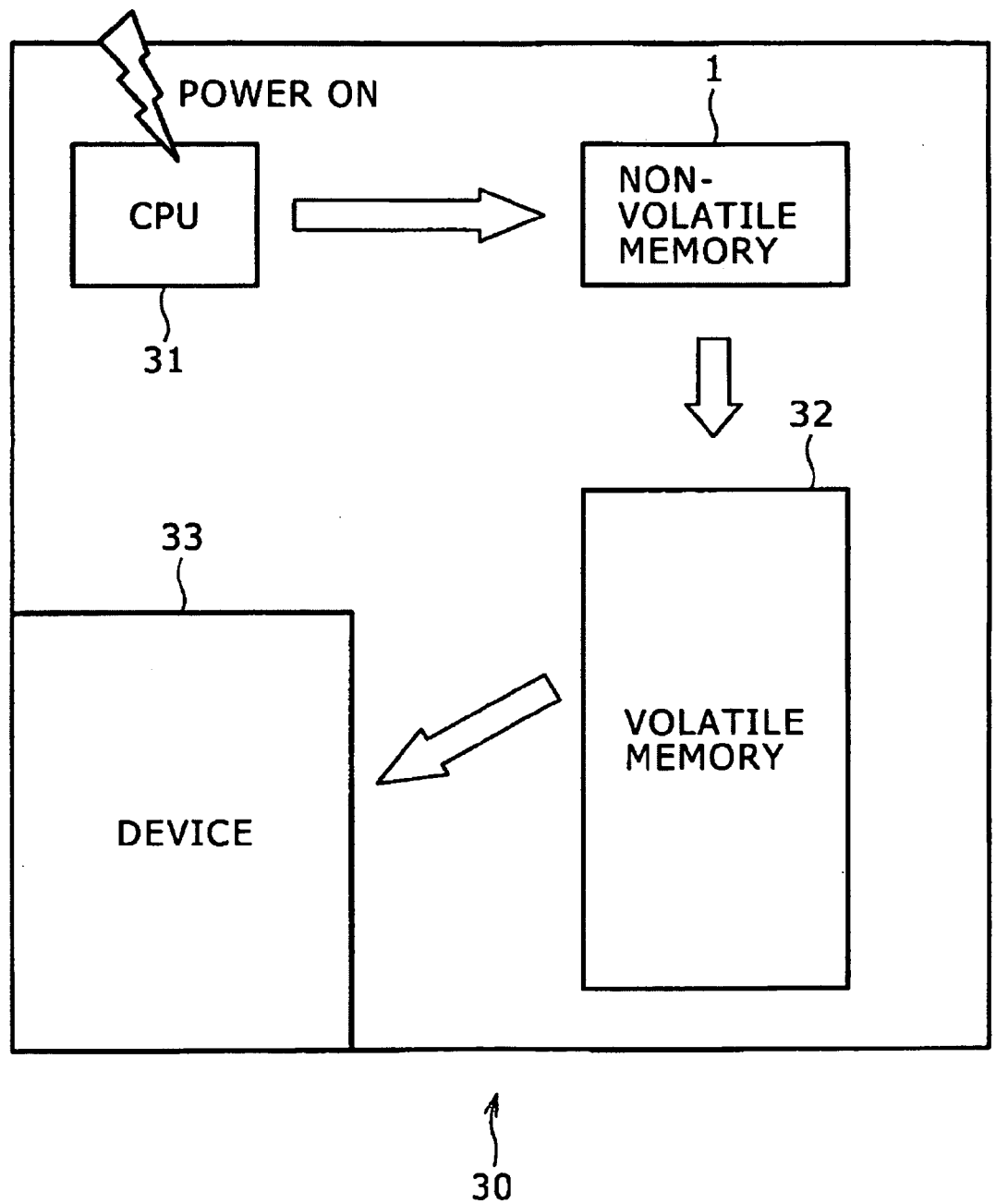
FIG. 2 illustrates a process that is performed by the conventional digital still camera having the nonvolatile memory 1 shown in FIG. 1.

Before embodiments of the present invention are described below, the relationship between several features recited in the accompanying claims and particular elements of the embodiments described below is described. The description, however, is merely for confirming that the particular elements which support the invention as recited in the claims are disclosed in the description of the embodiments of the present invention. Accordingly, even if some particular element, which is recited in the description of the embodiments, is not recited as one of the features in the following description, it does not signify that the particular element does not correspond to the feature. On the contrary, even if some particular element is recited as an element corresponding to one of the features, it does not signify that the element does not correspond to any other feature.

Further, the following description does not signify that the present invention corresponding to particular elements described in the embodiments of the present invention is entirely described in the claims. In other words, the following description does not deny the presence of an invention which corresponds to a particular element described in the description of the embodiments of the present invention but is not recited in the claims, that is, the description does not deny the presence of an invention which may be filed for patent in a divisional patent application or may be additionally included into the present patent application as a result of later amendment to the claims.

According to an embodiment of the present invention, there is provided a portable electronic apparatus (e.g., digital still camera 51 in FIG. 3) that is connected to an information processing apparatus (e.g., program server 53 in FIG. 3) via a network (e.g., network 52 in FIG. 3), the portable electronic apparatus including a storage section (e.g., nonvolatile memory 72 in FIG. 4) for storing a communication program (e.g., device driver 101 in FIG. 5) for communicating with the information processing apparatus; and an acquisition section (e.g., program acquisition section 162 in FIG. 8) for communicating with the information processing apparatus in accordance with the communication program when the power is turned on, and acquiring a program (e.g., digital still camera program 132 in FIG. 6) other than the communication program from the information processing apparatus via the network.

Figure 6:
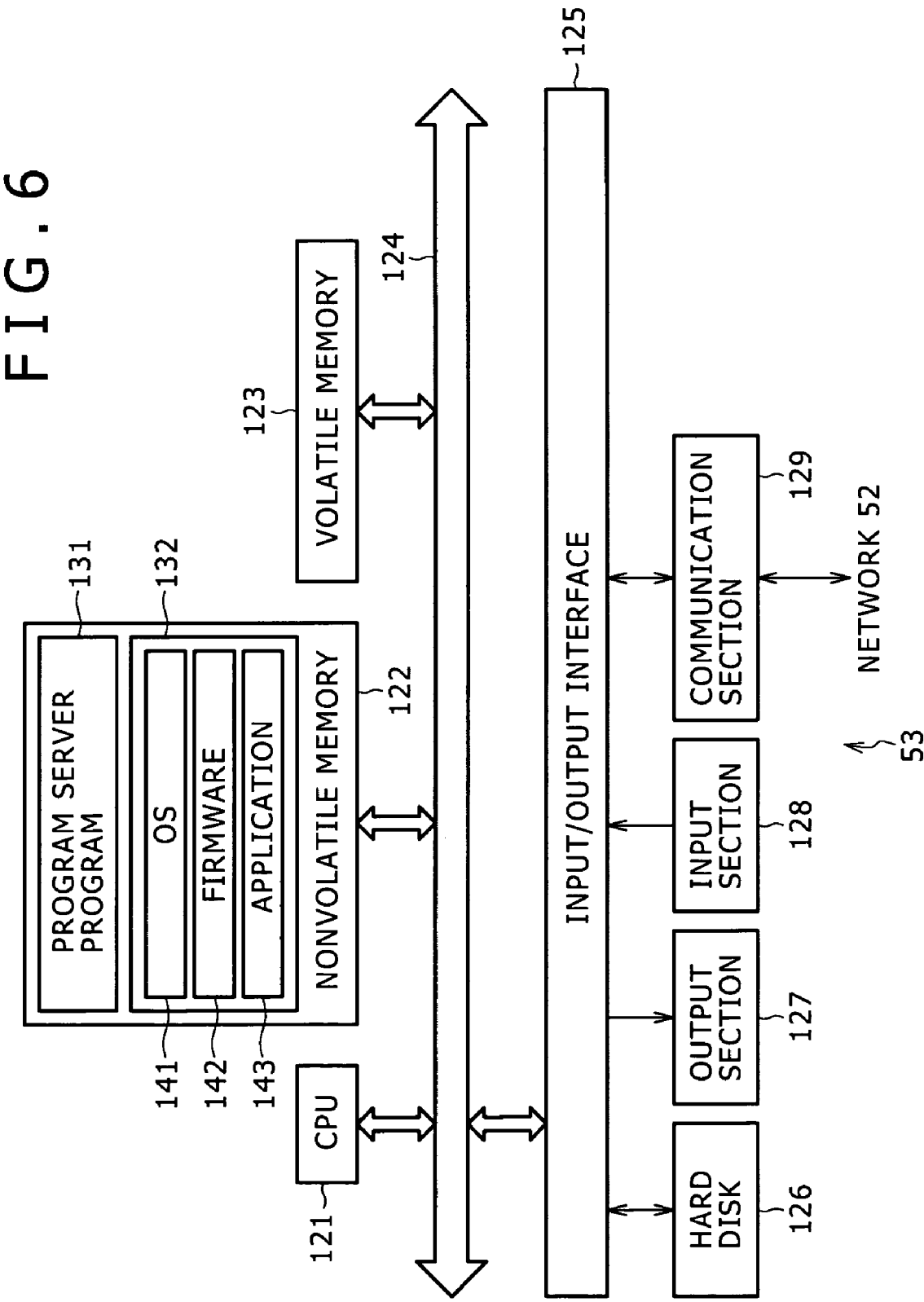
FIG. 6 illustrates a typical hardware configuration of the program server shown in FIG. 3.

According to another embodiment of the present invention, there is provided the portable electronic apparatus, wherein the program other than the communication program is an OS (Operating System) (e.g., OS 141 in FIG. 6), device driver, middleware (e.g., firmware 142 in FIG. 6), or application (e.g., application 143 in FIG. 6).

According to another embodiment of the present invention, there is provided the portable electronic apparatus, further including a shooting section (e.g., shooting section 80 in FIG. 4) for shooting a subject; and a transmission section (e.g., transmission section 182 in FIG. 11) for transmitting image data, which is obtained when the shooting section shoots a subject, to the information processing apparatus via the network and storing the image data.

Figure 11:
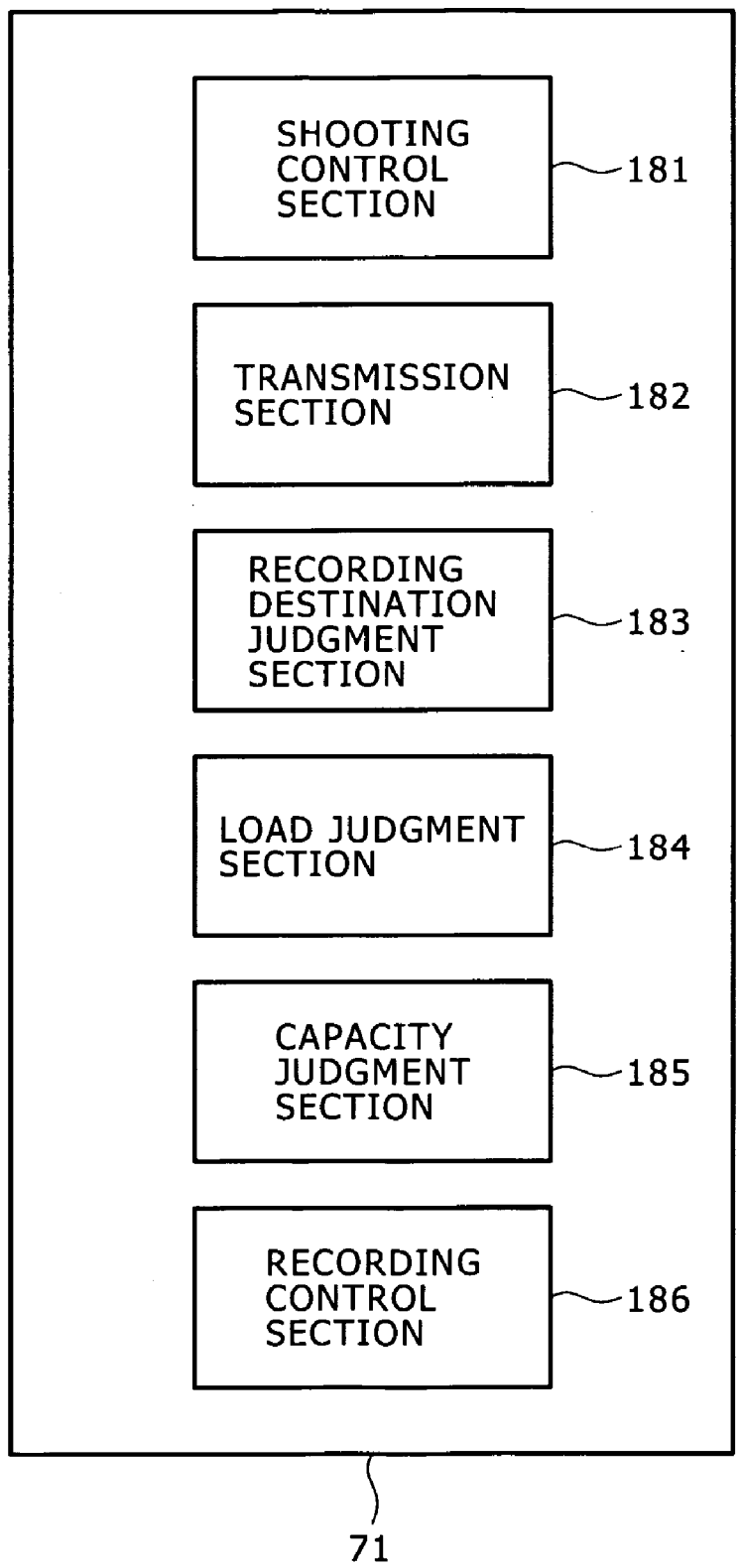
FIG. 11 is a block diagram illustrating an example of how the CPU shown in FIG. 4 is functionally configured for application execution.
Figure 12:
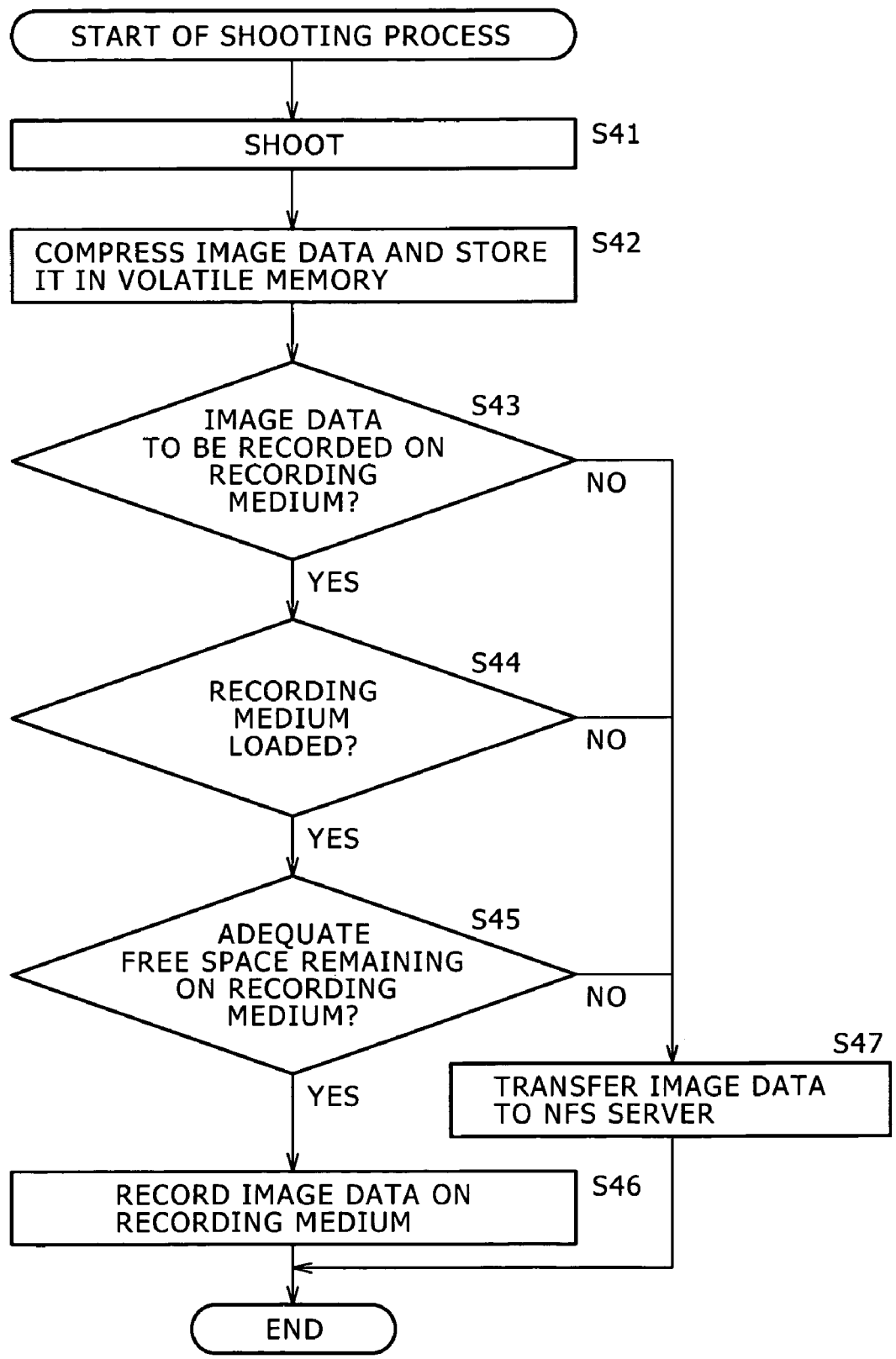
FIG. 12 is a flowchart illustrating a shooting process that is performed by the CPU shown in FIG. 11.

According to another embodiment of the present invention, there is provided the portable electronic apparatus, further including a load judgment section (e.g., load judgment section 184 in FIG. 11) for judging whether a recording medium for recording the image data is loaded, wherein, if the load judgment section judges that the recording medium is not loaded, the transmission section transmits the image data (e.g., performs processing step S47 in FIG. 12).

According to another embodiment of the present invention, there is provided the portable electronic apparatus, further including a capacity judgment section (e.g., capacity judgment section 185 in FIG. 11) for judging whether the free space remaining on the recording medium is smaller than a predetermined value, wherein the transmission section transmits the image data (e.g., performs processing step S47 in FIG. 12) even when the load judgment section judges that the recording medium is loaded and the capacity judgment section judges that the free space remaining on the recording medium is smaller than the predetermined value.

According to another embodiment of the present invention, there is provided an information processing method for use in a portable electronic apparatus (e.g., digital still camera 51 in FIG. 3) that is connected to an information processing apparatus (e.g., program server 53 in FIG. 3) via a network (e.g., network 52 in FIG. 3) and includes a storage section (e.g., nonvolatile memory 72 in FIG. 4) for storing a communication program (e.g., device driver 101 in FIG. 5) for communicating with the information processing apparatus, the information processing method including an acquisition step (e.g., step S4 in FIG. 9) for communicating with the information processing apparatus in accordance with the communication program when the portable electronic apparatus is turned on, and acquiring a program (e.g., digital still camera program 132 in FIG. 6) other than the communication program from the information processing apparatus via the network.

According to still another embodiment of the present invention, there is provided a program, which is executed by a computer controlling a portable electronic apparatus (e.g., digital still camera 51 in FIG. 3) that is connected to an information processing apparatus (e.g., program server 53 in FIG. 3) via a network (e.g., network 52 in FIG. 3) and performs a process for acquiring a predetermined program from the information processing apparatus via the network, the program including an acquisition step (e.g., step S4 in FIG. 9) for acquiring another program from the information processing apparatus via the network when the portable electronic apparatus is turned on.

Embodiments of the present invention will now be described in detail with reference to the accompanying drawings.

Figure 3:
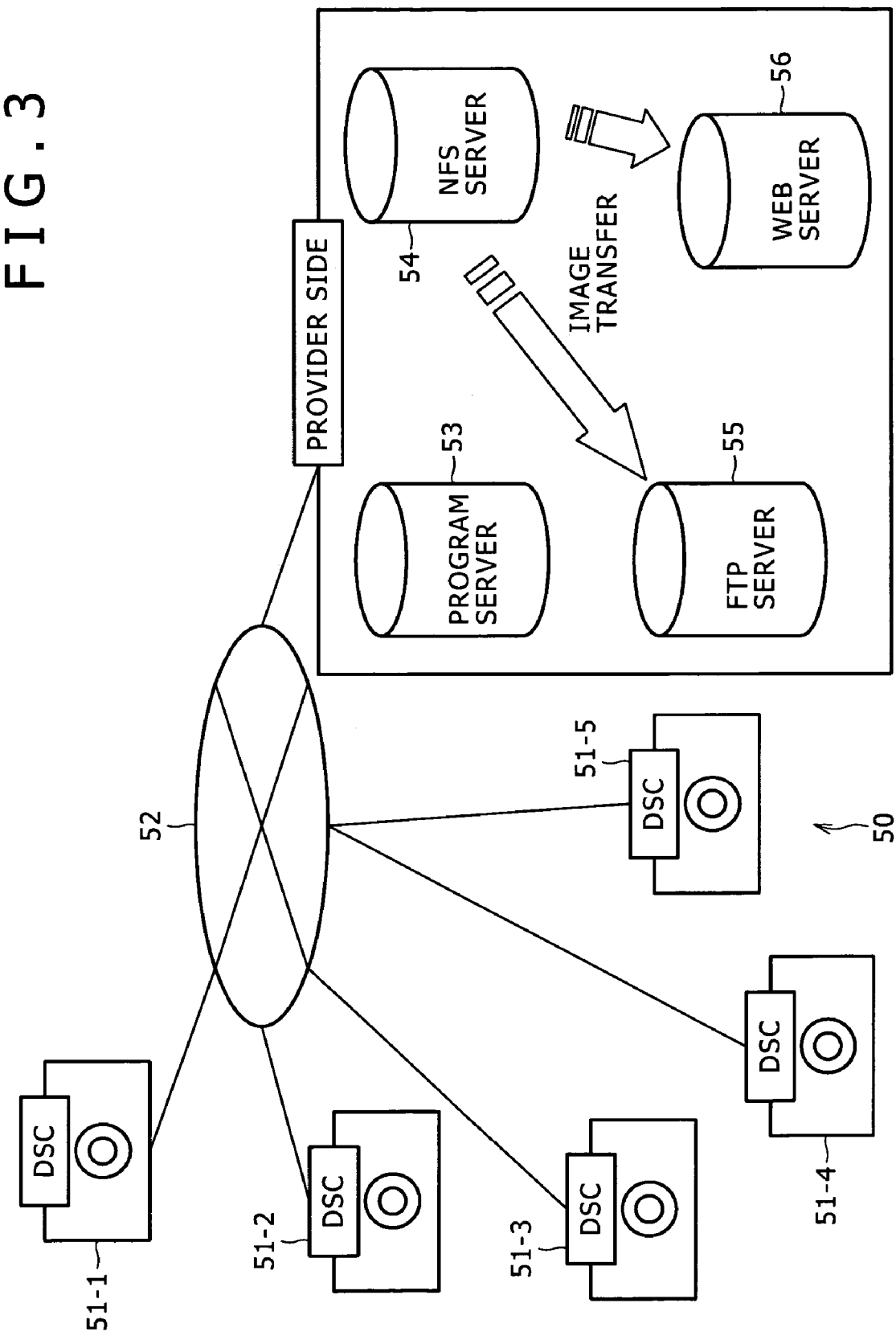
FIG. 3 illustrates a typical configuration of an information processing system according to one embodiment of the present invention.

FIG. 3 illustrates a typical configuration of an information processing system according to one embodiment of the present invention.

In the information processing system 50 shown in FIG. 3, digital still cameras (DSCs) 51-1 to 51-5 are connected via a network 52 to a program server 53, an NFS (Network File System) server 54, an FTP (File Transfer Protocol) server 55, and a WEB (World Wide Web) server 56, which are furnished by a provider. Digital still cameras 51-1 to 51-5 acquire a program from the program server 53 via the network 52.

When the power is turned on, digital still cameras 51-1 to 51-5 send a request for a program to the program server 53, which is furnished by the provider, via a wireless LAN (Local Area Network), the Internet, or other network 52. Digital still cameras 51-1 to 51-5 then acquire the program, which is transmitted in compliance with the request, via the network 52. Further, digital still cameras 51-1 to 51-5 shoot a subject, obtain image data as a result of shooting, and transmit the obtained image data to the NFS server 54, which is furnished by the provider.

In the subsequent description, the term "digital still cameras 51" is used in a situation where digital still cameras 51-1 to 51-5 need not be distinguished from each other.

The program server 53 receives the request for a program from the digital still cameras 51. In compliance with the request, the program server 53 transmits the program to the digital still cameras 51 via the network 52.

The NFS server 54 receives the image data from the digital still cameras 51 and stores the received image data. Further, the NFS server 54 transmits (forwards) the received image data to the FTP server 55 and WEB server 56 as needed.

The FTP server 55 receives the image data from the NFS server 54 and stores the received image data. The FTP server 55 releases an image corresponding to the locally stored image data to the outside by subjecting it to FTP transfer. When an image is released to the outside, it means that the image can only be read. More specifically, it means that the image is displayed or downloaded.

In the same manner as the FTP server 55, the WEB server 56 receives the image data from the NFS server 54 and stores the received image data. The WEB server 56 releases an image corresponding to the locally stored image data to the outside by subjecting it to HTTP (Hyper Text Transfer Protocol) transfer.

The user can pay the price for the storage capacity of a storage area in the FTP server 55 or WEB server 56 and receive from the provider the supply of a storage area having the storage capacity according to the price paid.

Figure 4:
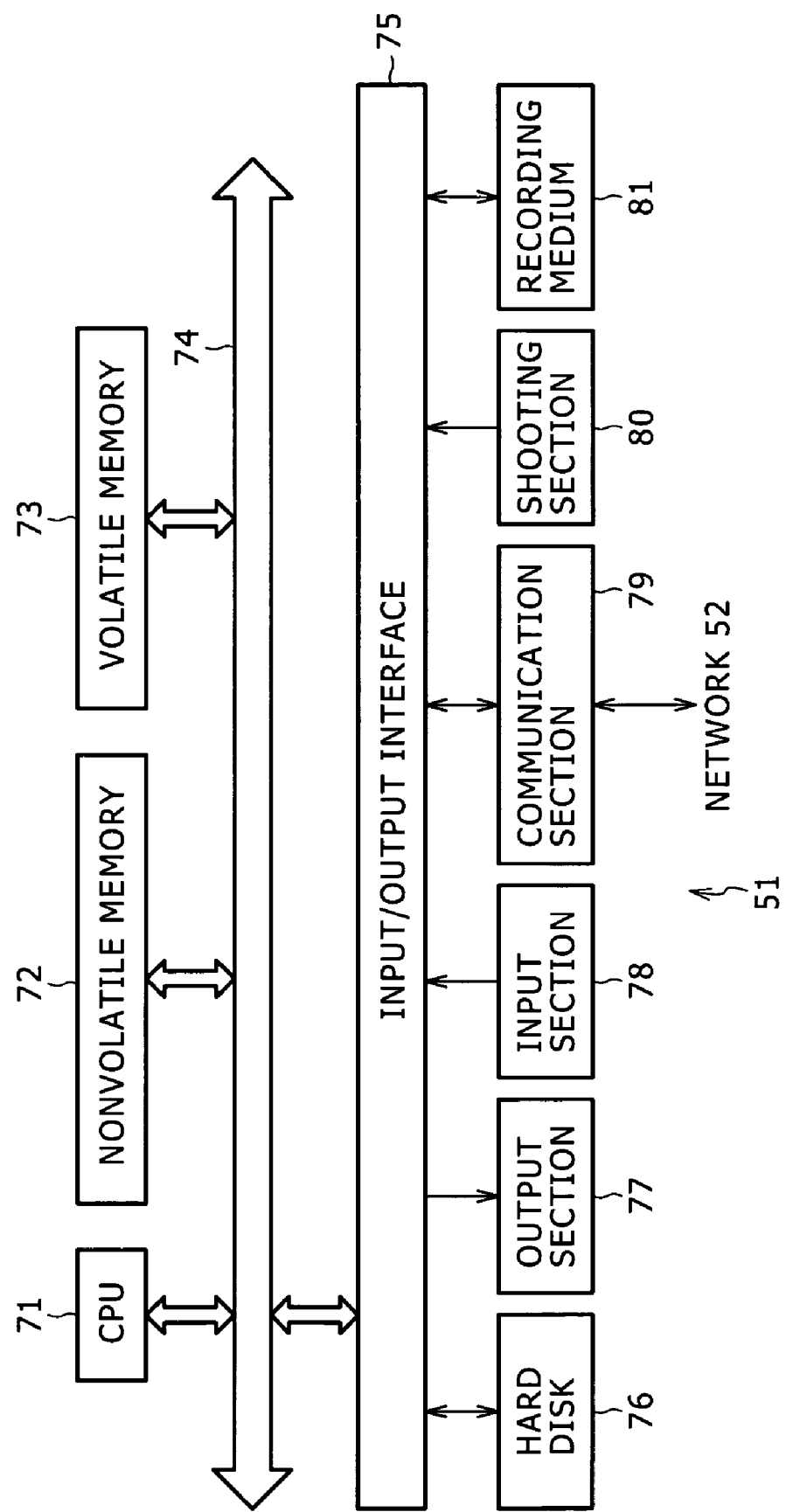
FIG. 4 is a block diagram illustrating a typical hardware configuration of a digital still camera that is shown in FIG. 3.

FIG. 4 is a block diagram illustrating a typical hardware configuration of a digital still camera 51 that is shown in FIG. 3.

As shown in FIG. 4, a CPU (Central Processing Unit) 71 is connected via a bus 74 to a nonvolatile memory 72, which includes an EEPROM, FLASHROM (flash memory), or the like, and a volatile memory 73, which includes a RAM or the like. An input/output interface 75 is also connected to the bus 74.

The CPU 71 performs various processes in accordance with a program stored in the nonvolatile memory 72 or a program stored in the volatile memory 73. For example, the CPU 71, nonvolatile memory 72, and volatile memory 73 are included in a microcomputer.

The nonvolatile memory 72 stores, for instance, a program for communicating with the program server 53, which is furnished by the provider.

The volatile memory 73 stores a program that is acquired from the program server 53 via a communication section 79. Further, the volatile memory 73 stores the data necessary for various process executions by the CPU 71 as needed. When the digital still camera 51 is turned off, the data stored in the volatile memory 73 is erased. However, while the digital still camera 51 is on standby, the data stored in the volatile memory 73 remains unerased.

The input/output interface 75 is connected to a hard disk 76; an output section 77, which includes an LCD (Liquid Crystal Display) and a speaker; an input section 78, which includes a keyboard, a mouse, and a microphone; a communication section 79, which includes a modem and a terminal adapter; and a shooting section 80, which includes a CCD (Charge Coupled Device) and a CMOS (Complementary Metal Oxide Semiconductor). The communication section 79 is connected to the network 52, which is shown in FIG. 3, and communicates via the network 52 with the program server 53, NFS server 54, FTP server 55, or WEB server 56, which are furnished by the provider.

Further, a recording medium 81 is connected as needed to the input/output interface 75. The recording medium 81 is used, for instance, to store image data that is obtained as a result of shooting by the shooting section 80.

Figure 5:
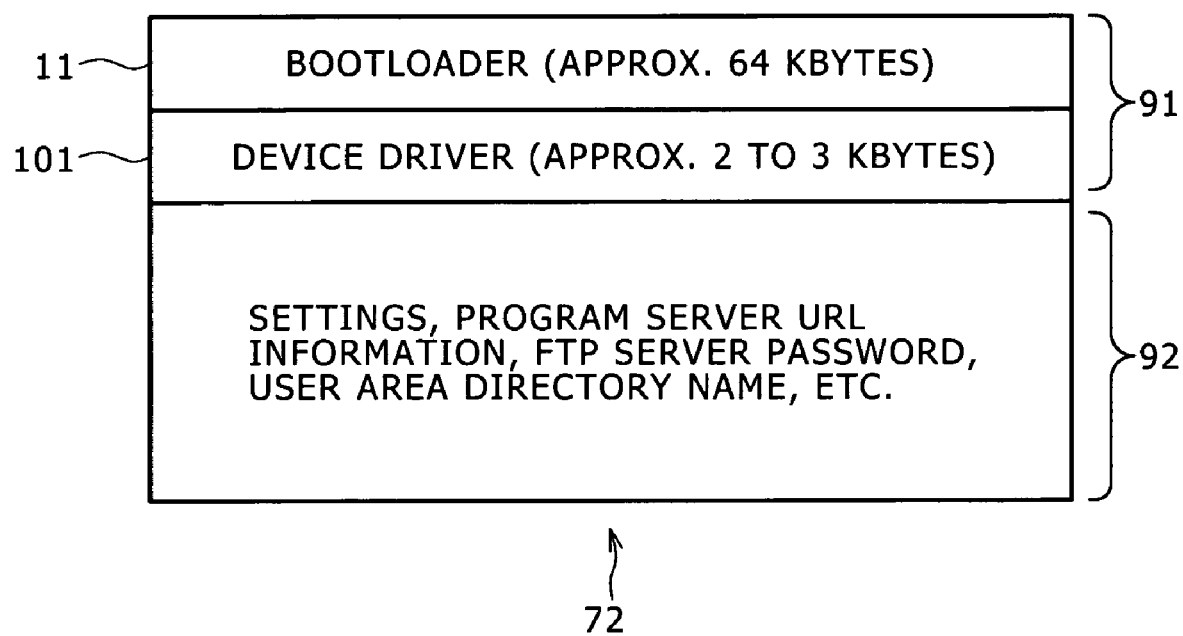
FIG. 5 shows programs that are stored in the nonvolatile memory shown in FIG. 4.

FIG. 5 shows programs that are stored in the nonvolatile memory 72, which is shown in FIG. 4.

Elements assigned the same reference numerals as those in FIG. 1 are identical with each other and will not be described repeatedly.

As shown in FIG. 5, the nonvolatile memory 72 stores a bootloader 91 and information 92. The bootloader 91 includes a bootloader 11 having a capacity of 64 kilobytes and a device driver 101 having a capacity of 2 to 3 kilobytes. The device driver 101 is a communication program for communicating with the program server 53.

The information 92 includes, for instance, various settings of the digital still camera 51 (e.g., various settings prevailing before the last power-off), URL (Uniform Resource Locator) information for accessing the program server 53, a password for the FTP server 55, and the directory name of a user area in the NFS server 54. The password for the FTP server 55 is a password that a person who shot an image, which is stored in the FTP server 55, has delivered only to a person who is permitted to view the image.

The digital still camera 51 performs various processes in accordance with the settings included in the information 92 and uses the URL information included in the information 92 to access the program server 53 and acquire a program.

Further, the digital still camera 51 uses the password included in the information 92 to request the release of an image stored in the FTP server 55 or uses a directory name included in the information 92 to access a user area in the NFS server 54 and store image data.

As shown in FIG. 5, the nonvolatile memory 72 stores the bootloader 91 and information 92 only. Therefore, the storage capacity of the nonvolatile memory 72 can be rendered smaller than that of the nonvolatile memory 1 that stores an OS 12, firmware 13, application 14, and the like in addition to the bootloader 11 as indicated in FIG. 1. As a result, the cost of the nonvolatile memory 72 can be reduced. If the nonvolatile memory 72 has the same storage capacity as the nonvolatile memory 1 shown in FIG. 1, the free space in the nonvolatile memory 72 is increased so that the area available to the user can be increased.

FIG. 6 illustrates a typical hardware configuration of the program server 53 shown in FIG. 3.

As shown in FIG. 6, a CPU 121 is connected to a nonvolatile memory 122 and a volatile memory 123 via a bus 124. An input/output interface 125 is also connected to the bus 124.

The CPU 121 performs various processes in accordance with a program server program 131 that is stored in the nonvolatile memory 122. The volatile memory 123 stores the data necessary for various process executions by the CPU 121 as needed.

The nonvolatile memory 122 stores the program server program 131, which is used to transmit a digital still camera program 132 via the network 52, and the digital still camera program 132. The digital still camera program 132 includes an OS (kernel) 141, firmware 142, which includes a device driver and middleware, and an application 143, which are required for the digital still camera 51 in addition to the bootloader 91 shown in FIG. 5. In other words, the digital still camera program 132 performs a process for enabling the digital still camera 51 to exercise its primary functions. It is subsequently assumed that the application 143 is a program for shooting a subject, acquiring image data as a result of shooting, and storing the acquired image data.

If the digital still camera program 132 is updated, the manufacturer replaces the digital still camera program 132 in the nonvolatile memory 122 with the updated digital still camera program 132. As a result, the nonvolatile memory 122 always stores the latest version of the digital still camera program 132.

The CPU 121 controls a communication section 129 in accordance with the program server program 131, and transmits the digital still camera program 132 stored in the nonvolatile memory 122 via the network 52 in compliance with a request from the digital still camera 51. Consequently, the digital still camera 51 can acquire the up-to-date digital still camera program 132.

The volatile memory 123 also stores the data necessary for various process executions by the CPU 121 as needed.

The input/output interface 125 is connected to a hard disk 126; an output section 127, which includes an LCD and a speaker; an input section 128, which includes a keyboard, a mouse, and a microphone; and a communication section 129, which includes a modem and a terminal adapter. The communication section 129 is connected to the network 52, which is shown in FIG. 3, and communicates with the digital still camera 51 via the network 52.

The NFS server 54, FTP server 55, and WEB server 56 shown in FIG. 3 are not diagrammatized or described herein because they have basically the same configuration as the program server 53. However, the nonvolatile memories 122 in these servers store the NFS server program, FTP server program, and WEB server program, respectively.

The NFS server program is used to store image data that is supplied from the digital still camera 51. The FTP server program and WEB server program are used to release an image that is derived from the image data transferred from the NFS server 54. The hard disk 126 in the NFS server 54 is provided with a user area that is used to store the image data supplied from the digital still camera 51.

The process performed by the information processing system 50 shown in FIG. 3 will now be described with reference to FIG. 7.

Figure 7:
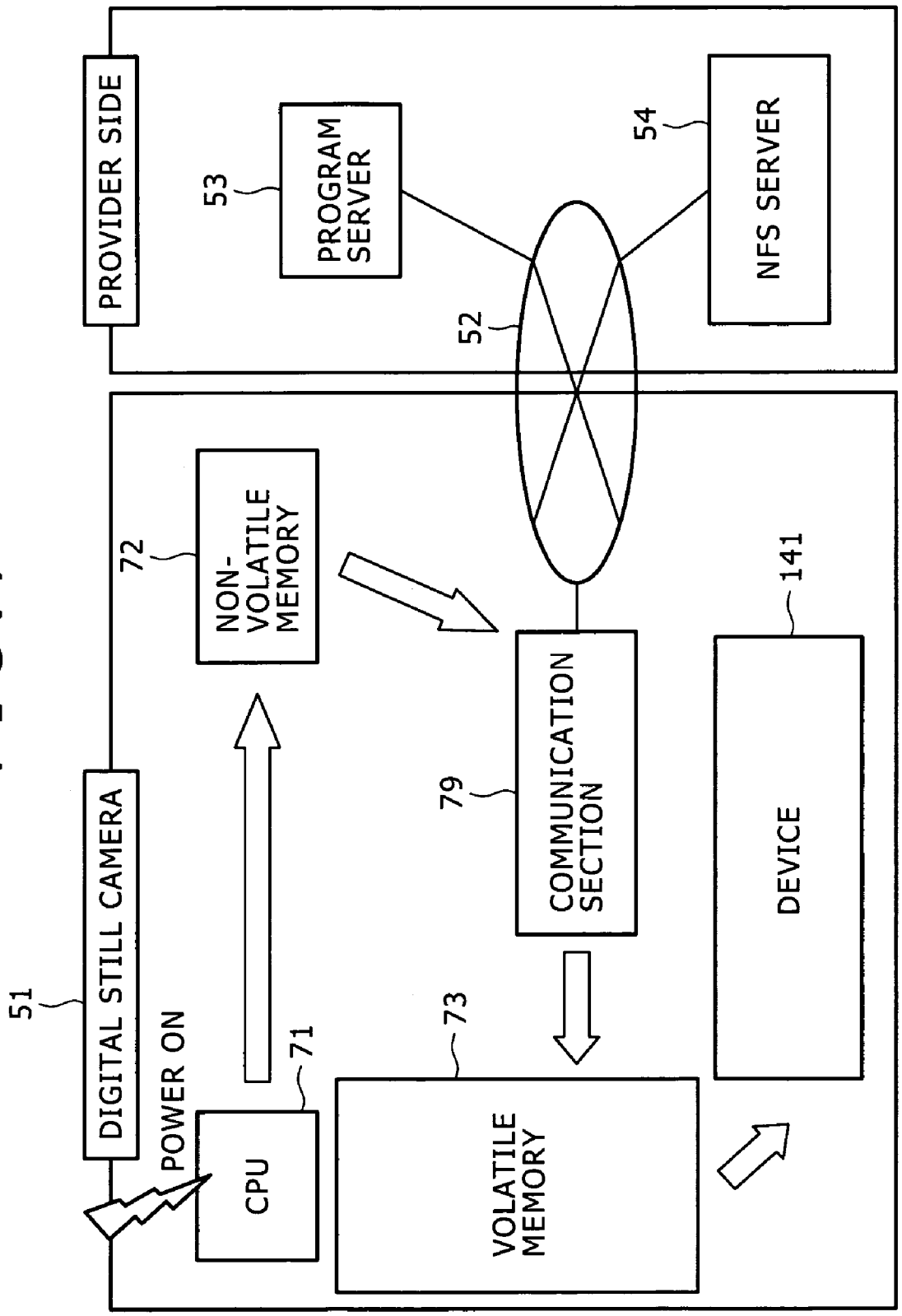
FIG. 7 illustrates a process that is performed by the information processing system shown in FIG. 3.

When the user issues a power-on instruction as indicated in FIG. 7, the CPU 71 in the digital still camera 51 reads and executes the bootloader 91 (FIG. 5) stored in the nonvolatile memory 72. The CPU 71 initializes the nonvolatile memory 72, volatile memory 73, and communication section 79 in accordance with the bootloader 91. In accordance with the bootloader 91, the CPU 71 also reads the URL information for accessing the program server 53, which is included in the information 92 stored in the nonvolatile memory 72. The CPU 71 controls the communication section 79, uses the URL information to access the program server 53 via the network 52, and issues a request for the digital still camera program 132 (FIG. 6).

In compliance with the request, the program server 53 transmits the digital still camera program 132 to the communication section 79 of the digital still camera 51 via the network 52. In accordance with the bootloader 91, the CPU 71 stores in the volatile memory 73 the digital still camera program 132 that is acquired (downloaded) from the program server 53 via the communication section 79. Subsequently, the CPU 71 starts the OS 141 for the digital still camera program 132, which is stored in the volatile memory 73, in accordance with the bootloader 91.

In accordance with the OS 141, the CPU 71 initializes the device 141, which includes the hard disk 76, output section 77, input section 78, and shooting section 80 shown in FIG. 4, and makes the digital still camera 51 ready for shooting.

Further, the CPU 71 controls the shooting section 80 in accordance with the application 143 and shoots a subject. The CPU reads, as needed, a directory name in the user area of the NFS server 54, which is included in the information stored in the nonvolatile memory 72. The CPU 71 then controls the communication section 79, uses the directory name to access the NFS server 54 via the network 52, obtains image data as a result of shooting, and transfers the image data to the NFS server 54 by means of the FTP.

The NFS server 54 receives the image data, which is transmitted from the digital still camera 51, and stores it in a user area on the hard disk. In other words, the NFS server 54 serves as a memory for storing image data that is obtained as a result of shooting by the digital still camera 51.

The NFS server 54 transmits the image data, which is supplied from the digital still camera 51, to the FTP server 55 and WEB server 56 (FIG. 3) as needed. The FTP server 55 and WEB server 56 release an image that corresponds to the image data.

Figure 8:
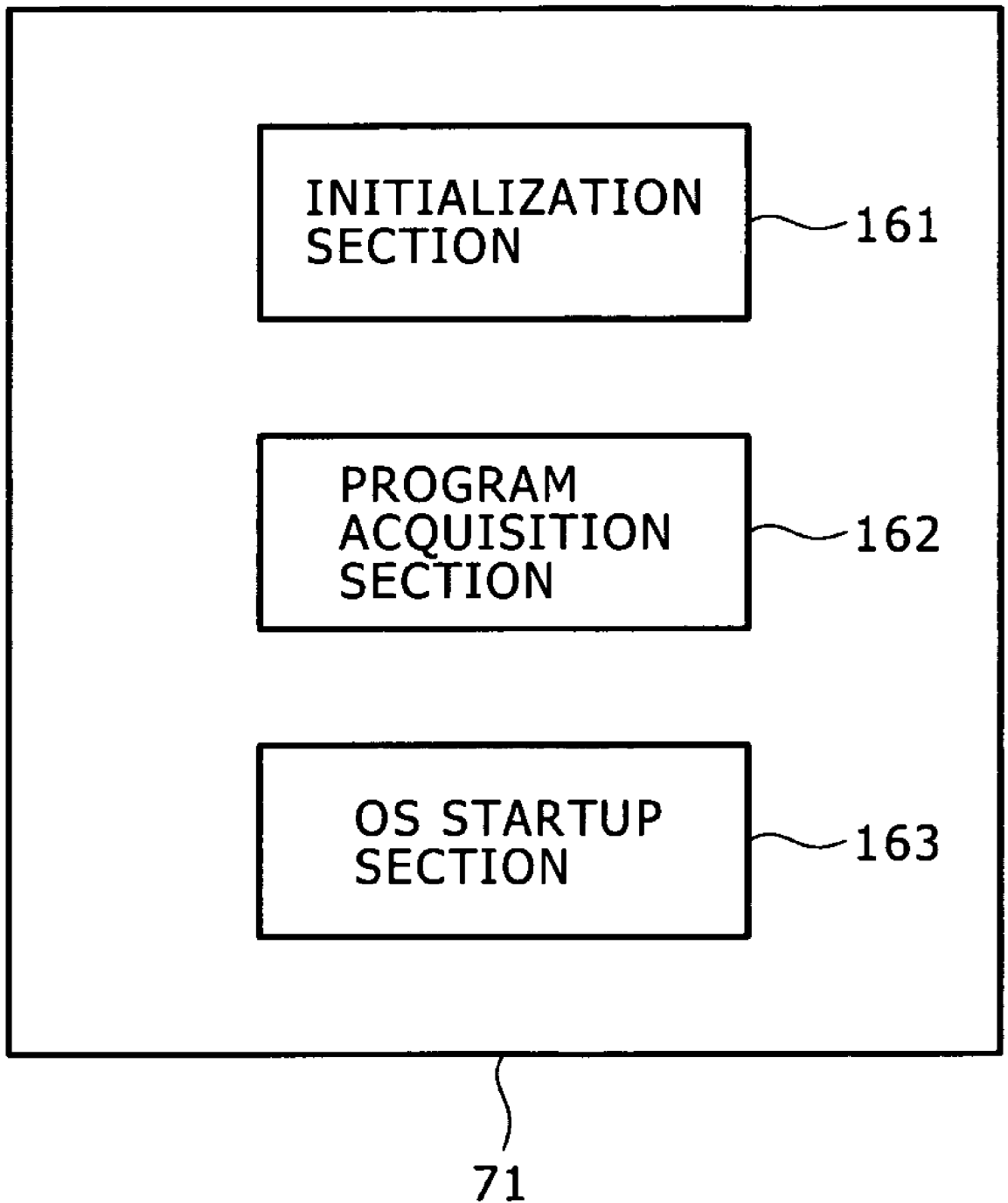
FIG. 8 is a block diagram illustrating an example of how the CPU shown in FIG. 4 is functionally configured for bootloader execution.

FIG. 8 is a block diagram illustrating an example of how the CPU 71 in FIG. 4 is functionally configured to execute the bootloader 91 in FIG. 5.

As shown in FIG. 8, the CPU 71 includes an initialization section 161, a program acquisition section 162, and an OS startup section 163.

The initialization section 161 initializes the nonvolatile memory 72, volatile memory 73, and communication section 79, which are the devices essential for communicating with the program server 53.

The program acquisition section 162 reads the URL information for accessing the program server 53, which is included in the information 92 stored in the nonvolatile memory 72. The program acquisition section 162 controls the communication section 79 and uses the URL information to send a request for the digital still camera program 132 to the program server 53 via the network 52. The program acquisition section 162 acquires the digital still camera program 132, which is transmitted from the program server 53 in compliance with the request. Further, the program acquisition section 162 supplies the acquired digital still camera program 132 to the volatile memory 73 for storage purposes.

The OS startup section 163 starts the OS 141 for the digital still camera program 132 stored in the volatile memory 73. More specifically, the OS startup section 163 issues a start instruction to the OS 141.

Figure 9:
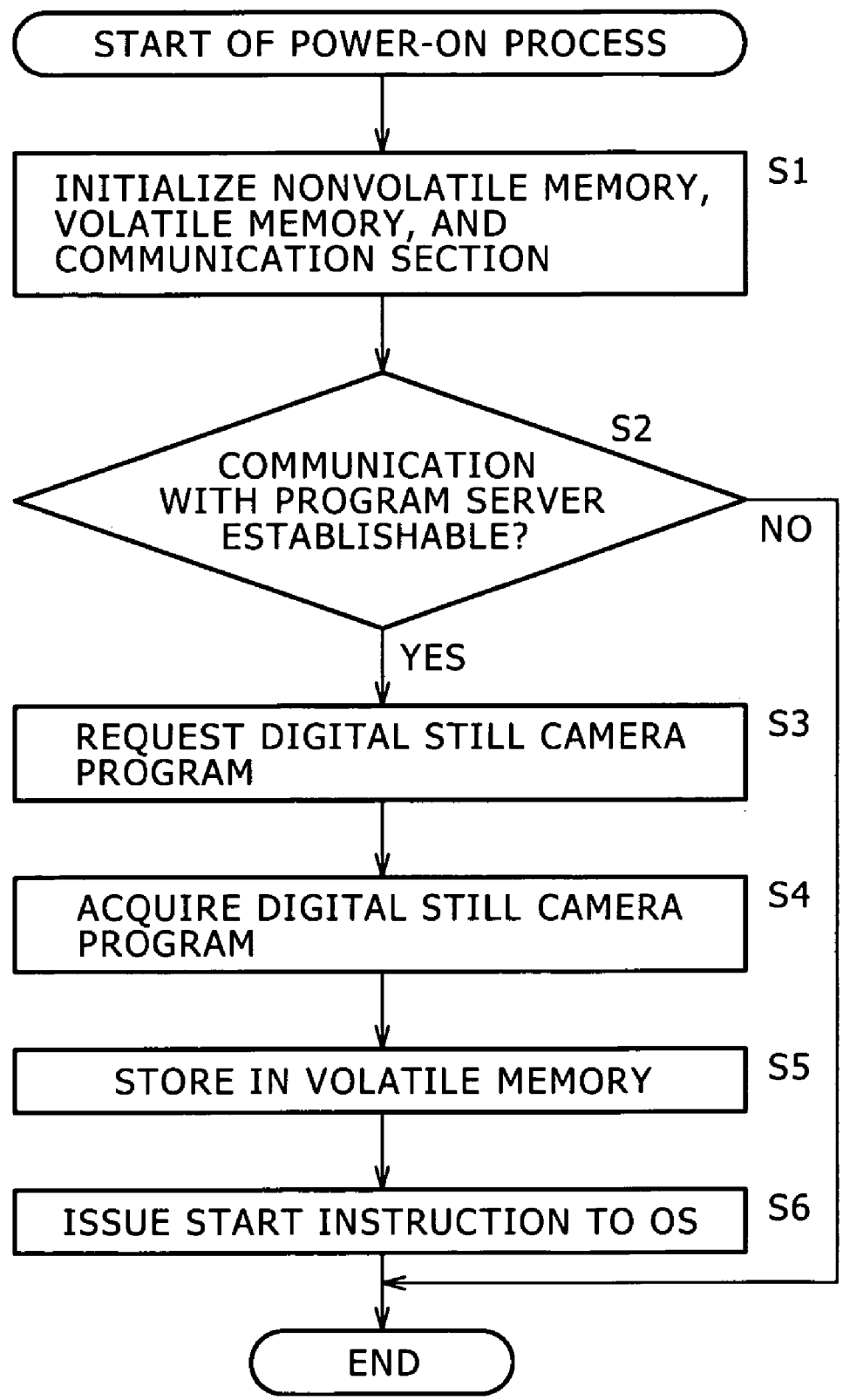
FIG. 9 is a flowchart illustrating a power-on process that is performed by the CPU shown in FIG. 8.

FIG. 9 is a flowchart illustrating a power-on process that is performed by the CPU shown in FIG. 8 when the digital still camera 51 is turned on to start the bootloader 91 (FIG. 5) stored in the nonvolatile memory 72. This power-on process will now be described with reference to FIG. 9.

In step S1, the initialization section 161 initializes the nonvolatile memory 72, volatile memory 73, and communication section 79, which are the devices essential for communicating with the program server 53. When step S1 is completed, the flow proceeds to step S2.

In step S2, the program acquisition section 162 judges whether the communication with the program server 53 can be established.

More specifically, the program acquisition section 162 reads, for instance, the URL information for accessing the program server 53, which is included in the information 92 stored in the nonvolatile memory 72. The program acquisition section 162 then controls the communication section 79 and uses the URL information to send a request for communication to the program server 53 via the network 52. If a response to the request is received from the program server 53 via the network 52 and communication section 79, the program acquisition section 162 judges that the communication with the program server 53 can be established. If no such response is received, the program acquisition section 162 judges that the communication with the program server 53 cannot be established.

If the judgment result obtained in step S2 indicates that the communication with the program server 53 can be established, the flow proceeds to step S3. In step S3, the program acquisition section 162 controls the communication section 79 and sends a request for the digital still camera program 132 to the program server 53 via the network 52.

When step S3 is completed, the flow proceeds to step S4. In step S4, the program acquisition section 162 acquires the digital still camera program 132, which is transmitted from the program server 53 in compliance with the request made in step S3. When step S4 is completed, the flow proceeds to step S5.

In step S5, the program acquisition section 162 stores the digital still camera program 132, which was acquired in step S4, in the volatile memory 73. Upon completion of step S5, the flow proceeds to step S6.

In step S6, the OS startup section 163 issues a start instruction to the OS 141 for the digital still camera program 132, which was stored in the volatile memory 73 in step S5. In other words, the OS startup section 163 starts the OS 141.

On the other hand, if the judgment result obtained in step S2 indicates that the communication with the program server 53 cannot be established, the flow skips steps S3 to S6 and terminates the process.

When the digital still camera 51 is turned on, the up-to-date digital still camera program 132, which is stored in the nonvolatile memory 122, is downloaded (acquired) from the program server 53 as described above. Therefore, the user does not have to periodically judge whether updated firmware 142 is created for the digital still camera program, that is, whether the locally stored firmware 142 should be updated. As a result, the user can always store the up-to-date firmware 142 in the digital still camera 51 without having to worry about a firmware update.

Further, the digital still camera program 132 is stored in the program server 53. Therefore, even if the digital still camera program 132 is not successfully downloaded due to an error, it is possible to perform a download again. This reduces the fear that the digital still camera 51 might not start up again.

Figure 10:
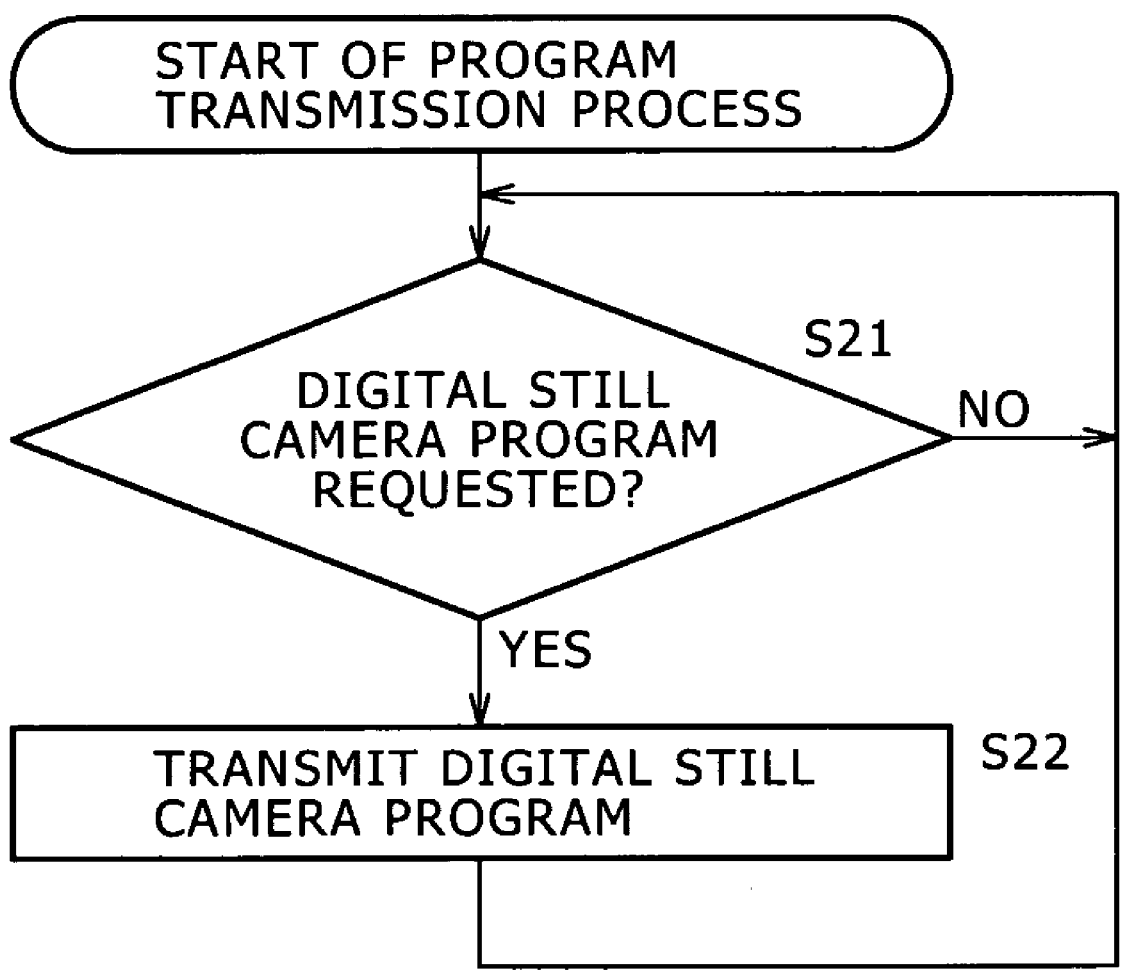
FIG. 10 is a flowchart illustrating a program transmission process that is performed by the program server shown in FIG. 6.

FIG. 10 is a flowchart illustrating a program transmission process that the program server 53 shown in FIG. 6 performs to transmit the digital still camera program 132 in accordance with the program server program 131. This program transmission process will now be described with reference to FIG. 10.

In step S21, the CPU 121 (FIG. 6) of the program server 53 judges whether the digital still camera 51 requested the digital still camera program 132 via the network 52 in step S3, which is shown in FIG. 9.

If the judgment result obtained in step S21 indicates that the digital still camera program 132 was not requested, the CPU 121 of the program server 53 stands by until the digital still camera program 132 is requested.

If, on the other hand, the judgment result obtained in step S21 indicates that the digital still camera program 132 was requested, the CPU 121 of the program server 53 reads the digital still camera program 132 from the nonvolatile memory 122 of the program server 53, controls the communication section 129 to transmit the read program to the digital still camera 51 via the network 52, and returns to step S21.

In step S4, which is shown in FIG. 9, the digital still camera 51 acquires the digital still camera program 132 that was transmitted in step S22.

FIG. 11 is a block diagram illustrating an example of how the CPU 71 in FIG. 4 is functionally configured to execute the application 143 that was stored in the volatile memory 73 in step S5, which is shown in FIG. 9.

As shown in FIG. 11, the CPU 71 includes a shooting control section 181, a transmission section 182, a recording destination judgment section 183, a load judgment section 184, a capacity judgment section 185, and a recording control section 186.

The shooting control section 181 controls the shooting section 80 shown in FIG. 4, shoots a subject, obtains image data as a result of shooting, and subjects the obtained image data to a JPEG (Joint Photographic Experts Group) or JPEG2000 compression process. The transmission section 182 reads the directory name of a user area in the NFS server 54, which is included in the information 92 stored in the nonvolatile memory 72. The transmission section 182 controls the communication section 79, uses the directory name to transmit the compressed image data to the NFS server 54 via the network 52, and stores the compressed image data in the user area on the hard disk 126 of the NFS server 54.

The recording destination judgment section 183 judges the destination to which the compressed image data is forwarded. For example, the user operates the input section 78 to display a menu screen, which is used to enter various settings, on the output section 77, and specifies the image data recording destination from the menu screen. The recording destination judgment section 183 judges the user-specified recording destination.

The load judgment section 184 judges whether a recording medium 81 is loaded into the digital still camera 51. The capacity judgment section 185 detects a free space on the recording medium 81 loaded into the digital still camera 51, and judges whether the free space is smaller than a predetermined value. This value is set by a manufacturer of the digital still camera 51 at the time of digital still camera manufacture. The recording control section 186 supplies the compressed image data to the recording medium 81 for storage purposes.

FIG. 12 is a flowchart illustrating a shooting process that is performed by the CPU 71 shown in FIG. 11 when the application 14, which was stored in the volatile memory 73 in step S5 as indicated in FIG. 9, is executed. This shooting process will now be described with reference to FIG. 12.

In step S41, the shooting control section 181 controls the shooting section 80 to shoot a subject. Upon completion of step S41, the flow proceeds to step S42.

In step S42, the shooting control section 181 compresses image data that is obtained as a result of shooting, and stores the compressed image data in the volatile memory 73. Upon completion of step S42, the flow proceeds to step S43.

In step S43, the recording destination judgment section 183 judges whether the compressed image data is to be recorded on the recording medium 81. If the recording destination for the compressed image data is the recording medium 81, the flow proceeds to step S44.

In step S44, the load judgment section 184 judges whether the recording medium 81 is loaded into the digital still camera 51. If it is judged that the recording medium 81 is loaded, the flow proceeds to step S45.

In step S45, the capacity judgment section 185 detects a free space (available space) that remains on the recording medium 81, and judges whether the free space is smaller than a predetermined value. If it is judged that the free space is not smaller than the predetermined value, the capacity judgment section 185 concludes that there is an adequate free space on the recording medium 81. Consequently, the flow proceeds to step S46.

In step S46, the recording control section 186 reads the compressed image data, which was stored in the volatile memory 73 in step S42, supplies the read image data to the recording medium 81, and records the image data on the recording medium 81. This brings the process to an end.

On the other hand, if the judgment result obtained in step S43 does not indicate that the compressed image data is to be recorded on the recording medium 81, if the judgment result obtained in step S44 does not indicate that the recording medium 81 is loaded, or if the judgment result obtained in step S45 indicates that the recording medium 81 does not have an adequate free space, that is, the detected free space is smaller than the predetermined value, the flow proceeds to step S47. In step S47, the transmission section 182 reads the directory name of a user area in the NFS server 54, which is included in the information 92 stored in the nonvolatile memory 72.

Further, the transmission section 182 reads the compressed image data, which was stored in step S42, from the volatile memory 73. The transmission section 182 then controls the communication section 79, uses the read directory name to transfer the compressed image to the NFS server 54 via the network 52 by means of the FTP, and stores the transferred image data in the user area on the hard disk 126 of the NFS server 54.

If it is judged in step S44 that the recording medium 81 is not loaded, the compressed image data is stored in the NFS server 54 as described above. Therefore, even if the user does not have a recording medium 81 at the time of shooting, it is possible to store image data that is obtained as a result of shooting.

Some recently available digital still cameras have a built-in nonvolatile memory for image data storage. The storage capacity of such a built-in memory generally ranges from 16 to 64 megabytes. If the image data for one image requires 1 megabyte of memory, the built-in memory can store image data for 16 to 64 images.

Meanwhile, the digital still camera 51 according to an embodiment of the present invention stores image data on the hard disk 126 of the NFS server 54, which generally has a large storage capacity. Therefore, the digital still camera 51 according to an embodiment of the present invention can store a larger amount of image data than conventional digital still cameras having a built-in memory.

Figure 13:
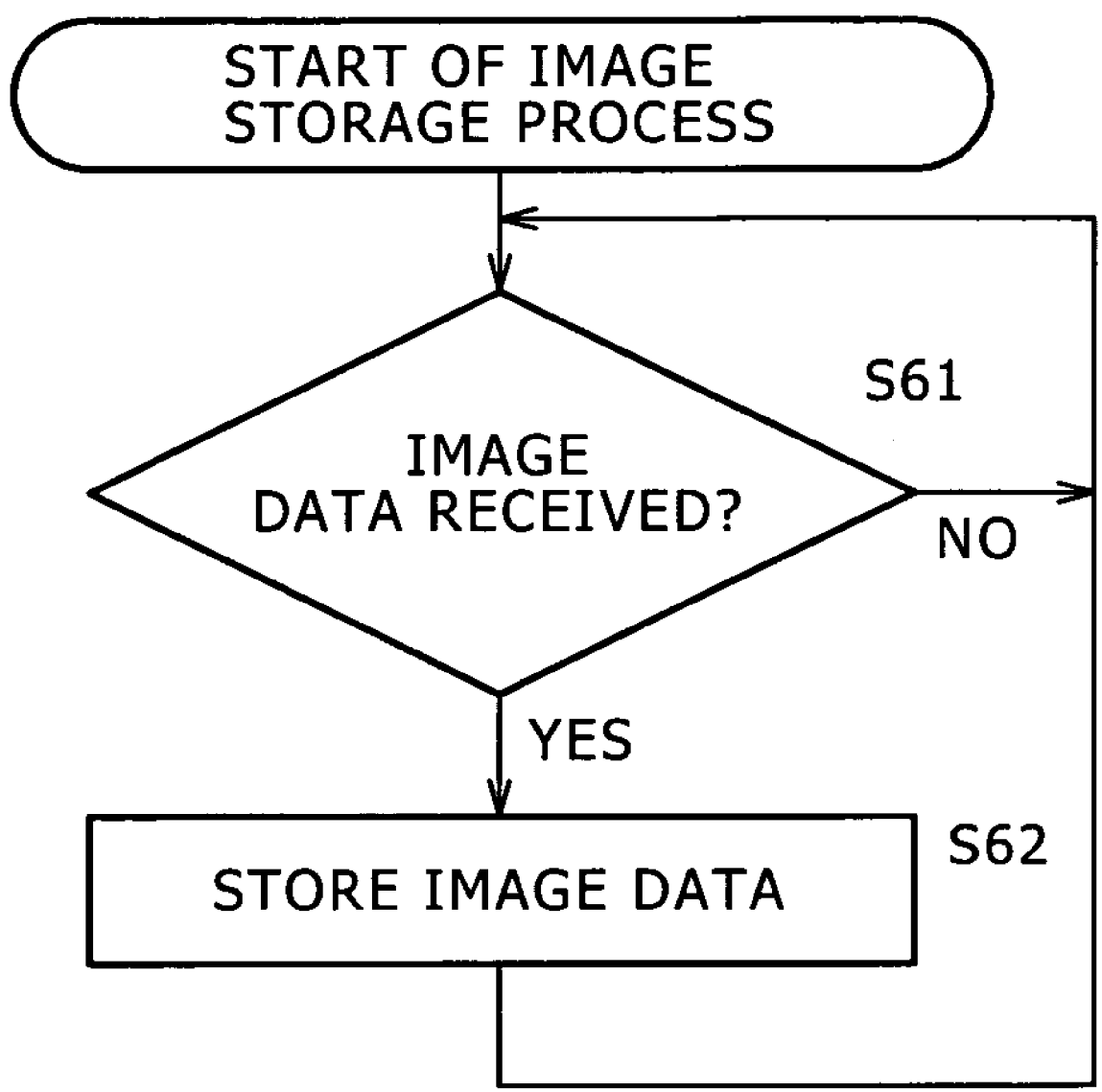
FIG. 13 is a flowchart illustrating an image storage process that is performed by the NFS server shown in FIG. 3.

FIG. 13 is a flowchart illustrating an image storage process that the NFS server 54 shown in FIG. 3 performs to store the compressed image data supplied from the digital still camera 51. This image storage process will now be described with reference to FIG. 13.

In step S61, the CPU 121 (FIG. 6) of the NFS server 54 judges whether the compressed image data, which is transmitted from the digital still camera 51 in step S47 in FIG. 12, is received via the network 52 and communication section 129. If it is judged that the compressed image data is not received, the CPU 121 stands by until the compressed image data is received.

If, on the other hand, it is judged in step S61 that the compressed image data is received, the flow proceeds to step S62. In step S62, the CPU 121 of the NFS server 54 stores the compressed image data in the user area on the hard disk 126. Upon completion of step S62, the flow returns to step S61.

When an image corresponding to the compressed image data, which is stored in the user area on the hard disk 126, is to be released to the outside by the user, the user operates, for instance, the input section 128 to instruct the digital still camera 51 to transfer the compressed image data, which is stored in the user area, to the FTP server 55 or WEB server 56. In compliance with such an instruction, the digital still camera 51 uses the directory name of the user area to access the NFS server 54 and instructs the NFS server 54 to transfer the compressed image data, which is stored in the user area, to the FTP server 55 or WEB server 56.

In compliance with an instruction from the digital still camera 51, the NFS server 54 reads the compressed image data from the user area on the hard disk 126, and transfers the read image data to the FTP server 55 or WEB server 56. The FTP server 55 or WEB server 56 receives the compressed image data from the NFS server 54 and stores it on the built-in hard disk 126. The FTP server 55 or WEB server 56 releases to the outside an image that corresponds to the compressed image data stored on the hard disk 126.

When an image is to be released, the FTP server 55 performs a password authentication process. The FTP server 55 gives permission for the release of the image only when the password authentication process is performed normally. If, for instance, the digital still camera 51 complies with a user's instruction and requests the FTP server 55 to release an image corresponding to compressed image data stored on the hard disk 126 in the FTP server 55, the CPU 71 of the digital still camera 51 reads a password for the FTP server 55, which is included in the information 92 stored in the nonvolatile memory 72, and transmits the password to the FTP server 55. The password may be set separately for all image data directories or for all pieces of image data.

The FTP server 55 performs an authentication process on the password transmitted from the digital still camera 51. When the authentication process is performed normally, the FTP server 55 gives permission for image release to the digital still camera 51. In other words, the FTP server 55 transmits compressed image data, which is stored on the built-in hard disk 126, to the digital still camera 51. The digital still camera 51 receives the compressed image data from the FTP server 55 and stores it on the hard disk 76 or displays an image corresponding to it on the output section 77. More specifically, the image corresponding to the image data stored on the hard disk 126 in the FTP server 55 is released to the digital still camera 51.

As described above, the FTP server 55 performs an authentication process on a password that is distributed from a shooter. This minimizes the possibility of releasing an image to persons who are not authorized by the shooter. Therefore, the shooter can safely release an image.

As described above, the information processing system 50 is capable of transmitting the image data about a shot image to the FTP server 55 or WEB server 56 and releasing the shot image when the user issues an appropriate instruction to the digital still camera 51. As a result, the user can allow a remote friend to view the shot image easily and promptly.

When the user wants to let a remote friend view a shot image during the use of a conventional digital still camera, the user has to take the trouble of recording the image data about the shot image onto a recording medium or printing the shot image onto paper.

On the other hand, the information processing system 50 eliminates the necessity for recording or printing the image data. Therefore, the user can allow a friend to view the shot image easily and promptly without having to take the trouble of recording or printing the image data.

The present embodiment assumes that the NFS server 54 stores the image data transmitted from the digital still camera 51. However, the NFS need not be mounted in the server that stores the image data.

When the digital still camera 51 shown in FIG. 3 is turned on, it acquires programs other than the bootloader 91 from the program server 53 via the network 52 as described earlier. Therefore, the digital still camera 51 can store up-to-date programs without fail.

The processing steps for describing the programs that cause a computer to perform various processes need not always be performed chronologically in the order indicated in the flowcharts. Some of the processing steps are performed simultaneously or individually (e.g., subjected to parallel processing or object-based processing).

It should be understood by those skilled in the art that various modifications, combinations, sub-combinations, and alterations may occur depending on design requirements and other factors insofar as they are within the scope of the appended claims or the equivalents thereof.

What is claimed is:

1. A portable electronic apparatus connected to an information processing apparatus via a network, the portable electronic apparatus comprising:
    a storage section for storing a communication program for communicating with the information processing apparatus;
    an acquisition section for:
        communicating with the information processing apparatus in accordance with the communication program when the portable electronic apparatus is turned on; and
        acquiring a program other than the communication program from the information processing apparatus via the network, the program being acquired automatically when the portable electronic apparatus is turned on;
    a shooting section for shooting a subject to obtain image data, the shooting being performed by using the acquired program; and
    a transmission section for transmitting, via the network, the image data to the information processing apparatus, wherein the transmitted image data is stored in the information processing apparatus.

2. The portable electronic apparatus according to claim 1, wherein the program other than the communication program is an OS (Operating System), a device driver, middleware, or an application.

3. The portable electronic apparatus according to claim 1, further comprising:
    a load judgment section for judging whether a recording medium for recording the image data is loaded, wherein the transmission section transmits the image data when the recording medium is not loaded.

4. The portable electronic apparatus according to claim 3, further comprising:
    a capacity judgment section for judging whether free space in the recording medium is less than a predetermined value,
    wherein the transmission section transmits the image data when the recording medium is loaded and the free space is less than the predetermined value.

5. An information processing method being executed by a portable electronic apparatus connected to an information processing apparatus via a network, the portable electronic apparatus including a storage section for storing a communication program for communicating with the information processing apparatus, the information processing method comprising:
    executing the communication program by using a processor in the portable electronic apparatus;
    communicating with the information processing apparatus in accordance with the communication program when the portable electronic apparatus is turned on;
    acquiring a program other than the communication program from the information processing apparatus via the network, the program being acquired automatically when the portable electronic apparatus is turned on;
    shooting a subject to obtain image data, the shooting being performed by using the acquired program;
    transmitting, via the network, the image data to the information processing apparatus; and
    storing the transmitted image data.

6. A computer-readable storage medium storing a communication program, which when executed by a portable electronic apparatus that is connected to an information processing apparatus via a network, causes the portable electronic apparatus to perform an information processing method, the information processing method comprising:
    acquiring a program other than the communication program from the information processing apparatus via the network when the portable electronic apparatus is turned on, the program being acquired automatically when the portable electronic apparatus is turned on;

shooting a subject to obtain image data, the shooting being performed by using the acquired program;

transmitting, via the network, the image data to the information processing apparatus; and storing the transmitted image data.

7. The information processing method according to claim 5, wherein the program other than the communication program is an OS (Operating System), a device driver, middleware, or an application.

8. The information processing method according to claim 5, further comprising:

judging whether a recording medium for recording the image data is loaded, wherein the image data is transmitted when the recording medium is not loaded.

9. The information processing method according to claim 8, further comprising:

judging whether free space in the recording medium is less than a predetermined value, wherein the image data is transmitted when the recording medium is loaded and the free space is less than the predetermined value.

10. The computer-readable storage medium according to claim 6, wherein the program other than the communication program is an OS (Operating System), a device driver, middleware, or an application.

11. The computer-readable storage medium according to claim 6, wherein the information processing method further comprises:

judging whether a recording medium for recording the image data is loaded, wherein the image data is transmitted when the recording medium is not loaded.

12. The computer-readable storage medium according to claim 11, wherein the information processing method further comprises:

judging whether free space in the recording medium is less than a predetermined value, wherein the transmission step transmits the image data is transmitted when the load judgment step judges that the recording medium is loaded and the capacity judgment step judges that the free space remaining on the recording medium is smaller less than the predetermined value.

* * * * *